Patented Sept. 15, 1931

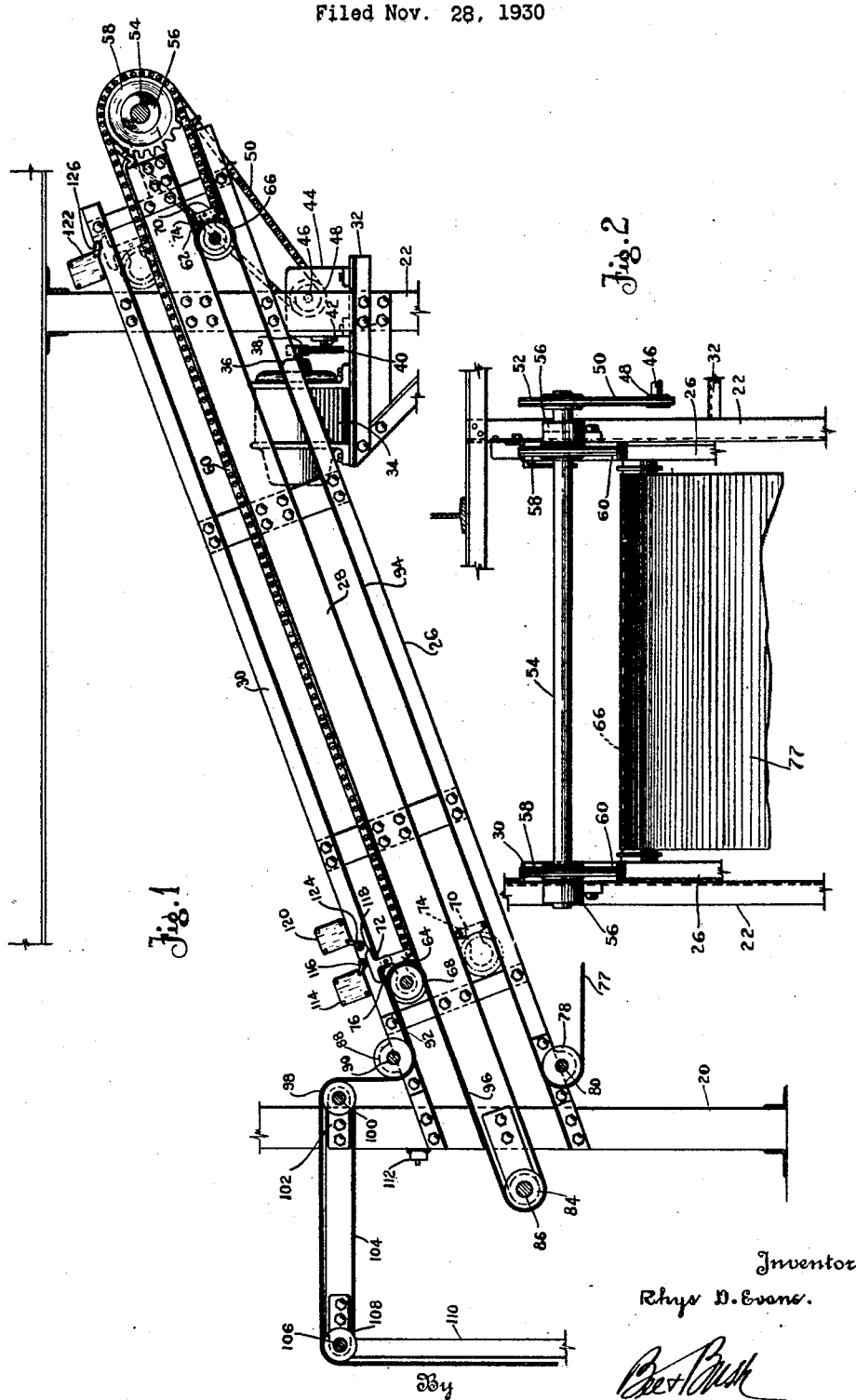

1,823,856

UNITED STATES PATENT OFFICE

RHYS D. EVANS, OF AKRON, OHIO, ASSIGNOR TO THE GOODYEAR TIRE & RUBBER COMPANY, OF AKRON, OHIO, A CORPORATION OF OHIO

FABRIC MANIPULATING MACHINE

Application filed November 28, 1930. Serial No. 498,536.

This invention relates to the inspection of fabrics for purposes of detecting flaws and defects therein, and it has particular relation to the inspection of continuously moving strips of fabric such as those employed in the manufacture of pneumatic tire carcasses.

The object of the invention is to provide a method of and apparatus for inspecting continuously moving strips which will permit of the temporary interruption of the movement of a predetermined area of the fabric without interruption of the remaining portions.

In the manipulation of fabrics, e. g. pickless cord fabric employed in the manufacture of pneumatic tires, it is necessary that a sheet of fabric moving from a suitable source of supply to a device for winding it up or for subjecting it to further treatment, e. g. a device for applying a coating of rubber compound thereto, be closely observed at all times in order to insure detection and removal of any flaws in the material which might be detrimental if incorporated into a finished product. In order to make an accurate inspection of a small portion of fabric, it is highly desirable that the section under inspection be maintained stationary for a short period of time. However, in the operation of apparatus heretofore employed in the manipulation of the fabrics, it was necessary to stop the movement of the entire sheet of fabric and the attendant mechanisms in order to make such inspections. Since frequent interruption in the operation of a large and complicated machine or sets of synchronized machines, such as those employed in the manufacture and treatment of fabrics, involves considerable inconvenience and expense, the operator employed to inspect the fabric was generally forced to confine his efforts to such hasty and unsatisfactory observations as may be obtained while the fabric is in motion.

This invention consists in the provision of a method of and apparatus for manipulating moving sheets of fabric which provides for temporary but complete or substantially complete stoppage of the movement of a small localized portion for purposes of inspection without the interruption of the movement of the fabric from the supply device to the apparatus for subsequently treating the fabric.

For a better understanding of the invention, reference may now be had to the accompanying drawings, forming a part of the specification, in which:

Fig. 1 is a cross-sectional view of one embodiment of the invention; and

Fig. 2 is a fragmentary end elevational view of a small portion of the apparatus disclosed in Fig. 1.

In a preferred embodiment of the invention, forward and rear vertical frame members 20 and 22, respectively, are interconnected by means of diagonally disposed braces 26, 28 and 30 which also constitute tracks. A shelf or bracket 32, preferably supported upon the frame 22, supports a motor 34 which is provided with a drive shaft 36. This shaft is rigidly keyed to a pinion 38 meshing with a gear 40 which is keyed to the shaft 42 of a conventional speed reducing mechanism 44.

Power is transmitted from the speed reducing mechanism by means of a projecting shaft 46 which has a sprocket gear 48 rigidly mounted thereon. A sprocket chain 50, trained about the gear 48, constitutes means for driving a second sprocket gear 52 (Fig. 2) which is mounted upon one extremity of a shaft 54. This shaft is rotatably mounted in bearings 56 which are mounted upon the extremities of the diagonally disposed connecting members 28. A pair of additional sprocket gears 58, also keyed upon the shaft 54 immediately adjacent to the brackets 56, constitute means for driving a pair of sprocket chains 60 which are trained thereabout. The extremities of these chains are attached respectively to a lower carriage 62 and an upper carriage 64, which are provided with rollers 66 and 68 which travel upon the upper faces of the brackets or guide members 26 and 28 respectively. The carriages 62 and 64 are also respectively provided with brackets 70 and 72 which constitute supports for small rollers 74 and 76. These rollers, by engaging the lower surfaces of the members 28 and 30 respectively, constitute means for maintaining the carriages upon their respective trackways. A sheet of fabric 77 from a suitable source of supply is directed to the roller 66 by means of a roller 78 mounted upon a shaft 80.

The fabric passing from the roller 66 is directed by means of a second guide roller 84 mounted upon a transverse shaft 86 to the roller 68 and is then guided over a roller 88 mounted upon a shaft 90 secured transversely of the members 30. These rollers 78, 66, 84, 68 and 88 constitute means for forming upper and lower extensible and retractable fabric loops 92 and 94 respectively. Observations of the fabric are usually made upon the lower portion 96 of the loop 92.

In order to insure ample room for an operator to stand adjacent this portion, the fabric from the guide roller 88 is directed upwardly about a roller 98 which is rotatably mounted upon a transverse shaft 100 secured to brackets 102 upon the frame 20. Forwardly projecting arms 104 are also secured to the frame 20 and the forward extremities thereof constitute supports for a shaft 106 which supports a guide roller 108 in such position as to receive the fabric from the roller 98 and direct it downwardly to a receiving mechanism, e. g. a calender for applying rubber compound thereto (not shown.) If desired, the end of the member 104 may be secured to an upright column 110 for purposes of providing a more rigid means of support.

In order to control the operation of the motor 34, a switch 112 is mounted upon the frame 20 in convenient reach of the operator who may be observing the portion 96 of the fabric. Reversal of the direction of rotation of the motor when the carriage 64 has reached the lower extremity of its path of travel, is secured by means of a switch 114 which carries an arm 116 that projects into the path of a cam 118 upon the bracket 72. Movement of the carriage is arrested by means of stop switches 120 and 122 which are secured to the member 30 adjacent to the lower and upper extremities thereof, respectively. These switches are also provided with arms 124 and 126 which, like the arm 116, project into the path of the cam 118.

In the operation of the mechanism, it will be assumed that a sheet of fabric 77 is traveling from a suitable source of supply about the roller 78 to the roller 66 and that the latter roller is at the lower limit of its path of travel while the roller 68 is at the upper extremity of its corresponding path. These positions are respectively indicated by the dotted lines in Fig. 1. The fabric from the roller 66 then passes to the stationary roller 84 thus forming the lower loop 94. The upper loop 92 is formed by passing the fabric about the roller 68 and then about the roller 88. From there it is directed over the rollers 98 and 108 to the receiving mechanism not shown. If it is desired to inspect a portion of fabric in the lower reach 96 of the loop 92, the operator actuates the switch 112 to start the motor 34. The latter in turn actuates the gear 58 and the shaft 54 to which the latter is attached. The sprocket chains 60 are thus actuated to move the carriage 62 upwardly at the same speed that fabric is fed to the roller 78. The carriage 64 correspondingly is permitted to move downwardly to feed fabric to the roller 88. Since the motor 34 is so synchronized as to cause the carriages supporting the rollers 66 and 68 to move at identically the same speed as the supply and take-up mechanisms, it is obvious that the speed of the latter is in no wise affected while the traveling rollers are moved from one extreme position to the other. During this interval, the portion of fabric 96 is maintained stationary or approximately so thus permitting the operator stationed adjacent thereto to make accurate and relatively prolonged observations. When the carriage 64 has reached the lower limit of its travel, the cam 118 contacts with the switch arm 124, thus de-energizing the motor. However, the inertia of the mechanism causes the carriage to travel past the arm 124 and to contact with the arm 116 of the reversing switch 114, thus reversing the direction of flow of current to the motor and causing the carriages 62 and 64 to be returned to their initial positions.

From the preceding description, it is apparent that an extremely simple mechanism is provided whereby fabric may be continuously fed from a suitable source of supply to a manipulating mechanism in which small portions of fabric may be stopped for a considerable period of time for careful examination without any interruption or modification either of the rate of withdrawal of fabric from the source of supply or the rate it is fed to the calender.

Although I have described and illustrated only the preferred form of the invention, it will be apparent to those skilled in the art that the invention is not so limited but that various modifications may be made therein without departing from the spirit of the invention or from the scope of the appended claims.

What I claim is:

1. A machine for inspecting continuously moving sheets of material comprising means for forming a reserve loop, means for stopping a portion of fabric between the reserve loop and the source of supply, and means between the second mentioned means and the source of supply for taking-up fabric from the source of supply while the second mentioned means is in operation.

2. A machine for inspecting continuously moving sheets of material comprising means for forming a reserve loop, means for stopping a portion of fabric between the reserve loop and the source of supply, means between the second mentioned means and the source of supply for taking-up fabric from the source of supply while the second mentioned means is in operation, and additional means for accelerating the movement of the fabric past the point of observation in order to restore the mechanism to its initial condition.

3. A machine for inspecting moving sheets of flexible material comprising a pair of take-up rollers, means interconnecting the rollers for causing them simultaneously to move in opposite directions, a fixed roller disposed between the take-up rollers whereby to form a loop of material between the latter, means to supply materials to one of the take-up rollers and to transmit material from the remaining take-up roller, and means to stop the movement of the loop of material between the take-up rollers.

4. A machine for inspecting a moving sheet of flexible material comprising a frame, a pair of parallel movable take-up rollers mounted on the frame, a flexible member interconnecting the rollers, means for supporting the flexible member, rollers for guiding the material to and from the take-up rollers, and means for stopping the movement of a portion of fabric between the two rollers.

5. A machine for inspecting moving sheets of flexible material comprising a pair of parallel take-up rollers, a flexible member interconnecting the take-up rollers, means for actuating the flexible member whereby to cause the rollers to travel in opposite directions, and means to direct fabric to and from the rollers.

6. A method of inspecting a sheet of moving fabric which comprises forming a reserve loop of fabric at one point, stopping the movement of fabric at a point between the reserve loop and the source of supply, inspecting this portion of fabric and at the same time taking-up the fabric from the source of supply to form a second loop and subsequently accelerating the rate of movement of the fabric past the point of inspection to take up the latter reserve loop and to restore the first mentioned reserve loop.

7. A machine for inspecting continuously moving lengths of flexible material comprising means for forming a reserve loop, means for stopping a portion of the material between the reserve loop and the source of supply and means for accelerating the material past the point of observation in order to maintain the reserve loop.

8. A machine for inspecting continuously moving lengths of flexible material comprising means for forming a reserve loop, means for stopping a portion of the material between the reserve loop and the source of supply and means for re-establishing the reserve loop after depletion thereof.

9. A machine for inspecting continuously moving lengths of flexible material comprising means for forming a reserve loop, and means for stopping a portion of the material between the reserve loop and the source of supply.

10. A machine for inspecting continuously moving lengths of flexible material comprising means for forming a reserve of material, means for stopping a portion of the material between the reserve and the source of supply and means for re-establishing the reserve after depletion thereof.

In witness whereof, I have hereunto signed my name at Akron, in the county of Summit and State of Ohio, U. S. A., this 25th day of November, 1930.

RHYS D. EVANS.